(12) United States Patent
Touboul et al.

(10) Patent No.: US 9,954,878 B2
(45) Date of Patent: Apr. 24, 2018

(54) MULTI-FACTOR DECEPTION MANAGEMENT AND DETECTION FOR MALICIOUS ACTIONS IN A COMPUTER NETWORK

(71) Applicant: Illusive Networks Ltd., Tel Aviv (IL)

(72) Inventors: Shlomo Touboul, Kfar Chaim (IL); Hanan Levin, Tel Aviv (IL); Stephane Roubach, Herzliya (IL); Assaf Mischari, Petach Tikva (IL); Itai Ben David, Tel Aviv (IL); Itay Avraham, Tel Aviv (IL); Adi Ozer, Shoham (IL); Chen Kazaz, Tel Aviv (IL); Ofer Israeli, Tel Aviv (IL); Olga Vingurt, Shderot (IL); Liad Gareh, Herzliya (IL); Israel Grimberg, Ra'anana (IL); Cobby Cohen, Tel Aviv (IL); Sharon Sultan, Tel Aviv (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 15/175,052

(22) Filed: Jun. 7, 2016

(65) Prior Publication Data
US 2017/0230384 A1    Aug. 10, 2017

Related U.S. Application Data

(60) Provisional application No. 62/172,251, filed on Jun. 8, 2015, provisional application No. 62/172,253, filed
(Continued)

(51) Int. Cl.
*G06F 7/04* (2006.01)
*G06F 15/16* (2006.01)
(Continued)

(52) U.S. Cl.
CPC ...... *H04L 63/1416* (2013.01); *H04L 63/1491* (2013.01); *H04L 29/06904* (2013.01); *H04L 63/10* (2013.01); *H04L 63/1433* (2013.01)

(58) Field of Classification Search
CPC ............. H04L 63/1433; H04L 63/1491; H04L 29/06904
See application file for complete search history.

(56) References Cited

U.S. PATENT DOCUMENTS 6,363,489 B1    3/2002   Comay et al.
6,618,709 B1    9/2003   Sneeringer
(Continued)

FOREIGN PATENT DOCUMENTS

WO    2006131124 A1    12/2006
WO    2015001969 A1    1/2015
WO    2015047555 A1    4/2015

OTHER PUBLICATIONS

PCT Application No. PCT/IL16/50582, International Search Report and Written Opinion, dated Nov. 16, 2016, 11 pages.
(Continued)

*Primary Examiner* — Daniel Potratz
(74) *Attorney, Agent, or Firm* — Soquel Group I.P Ltd

(57) ABSTRACT

A network surveillance system, including a management server within a network of resources in which users access the resources in the network based on credentials, including a deployment module planting honeytokens in resources in the network, wherein a honeytoken is an object in memory or storage of a first resource that may be used by an attacker to access a second resource using decoy credentials, and wherein the deployment module plants a first honeytoken in a first resource, $R_1$, used to access a second resource, $R_2$, using first decoy credentials, and plants a second honeytoken in $R_2$, used to access a third resource, $R_3$, using second decoy credentials, and an alert module alerting that an
(Continued)

attacker is intruding the network only in response to both an attempt to access $R_2$ using the first decoy credentials, and a subsequent attempt to access $R_3$ using the second decoy credentials.

4 Claims, 6 Drawing Sheets

Related U.S. Application Data on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(51) Int. Cl.
*G06F 17/30* (2006.01)
*H04L 29/06* (2006.01)

(56) References Cited

U.S. PATENT DOCUMENTS

| | | |
|---|---|---|
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |
| 8,181,249 B2 | 5/2012 | Chow et al. |
| 8,181,250 B2 | 5/2012 | Rafalovich et al. |
| 8,250,654 B1 | 8/2012 | Kennedy et al. |
| 8,375,447 B2 | 2/2013 | Amoroso et al. |
| 8,499,348 B1 | 7/2013 | Rubin |
| 8,528,091 B2 | 9/2013 | Bowen et al. |
| 8,549,642 B2 | 10/2013 | Lee |
| 8,549,643 B1 | 10/2013 | Shou |
| 8,719,938 B2 | 5/2014 | Chasko et al. |
| 8,739,281 B2 | 5/2014 | Wang et al. |
| 8,739,284 B1 | 5/2014 | Gardner |
| 8,769,684 B2 | 7/2014 | Stolfo et al. |
| 8,819,825 B2 | 8/2014 | Keromytis et al. |
| 8,826,400 B2* | 9/2014 | Amaya Calvo ..... H04L 63/1441 713/168 |
| 8,856,928 B1 | 10/2014 | Rivner et al. |
| 8,880,435 B1* | 11/2014 | Catlett ................... G06Q 20/10 705/75 |
| 8,925,080 B2* | 12/2014 | Hebert ................ H04L 63/1491 726/23 |
| 9,009,829 B2 | 4/2015 | Stolfo et al. |
| 9,043,905 B1 | 5/2015 | Allen et al. |
| 9,124,622 B1 | 9/2015 | Falkowitz et al. |
| 9,152,808 B1 | 10/2015 | Ramalingam et al. |
| 9,240,976 B1 | 1/2016 | Murchison |
| 9,325,728 B1 | 4/2016 | Kennedy et al. |
| 9,356,942 B1 | 5/2016 | Joffe |
| 9,418,222 B1* | 8/2016 | Rivera ................... G06F 21/554 |
| 9,495,188 B1 | 11/2016 | Ettema et al. |
| 2002/0066034 A1 | 5/2002 | Schlossberg et al. |
| 2003/0084349 A1 | 5/2003 | Friedrichs et al. |
| 2003/0145224 A1 | 7/2003 | Bailey |
| 2004/0088581 A1 | 5/2004 | Brawn et al. |
| 2004/0160903 A1 | 8/2004 | Gai et al. |
| 2004/0172557 A1 | 9/2004 | Nakae et al. |
| 2004/0255155 A1 | 12/2004 | Stading |
| 2005/0114711 A1 | 5/2005 | Hesselink et al. |
| 2005/0132206 A1 | 6/2005 | Palliyil et al. |
| 2005/0149480 A1 | 7/2005 | Deshpande |
| 2005/0235360 A1 | 10/2005 | Pearson |
| 2006/0041761 A1 | 2/2006 | Neumann et al. |
| 2006/0101516 A1 | 5/2006 | Sudaharan et al. |
| 2006/0161982 A1 | 7/2006 | Chari et al. |
| 2006/0224677 A1 | 10/2006 | Ishikawa et al. |
| 2006/0242701 A1 | 10/2006 | Black et al. |
| 2007/0028301 A1 | 2/2007 | Shull et al. |
| 2007/0157315 A1 | 7/2007 | Moran |
| 2007/0192853 A1 | 8/2007 | Shraim et al. |
| 2008/0016570 A1 | 1/2008 | Capalik |
| 2008/0086773 A1 | 4/2008 | Tuvell et al. |
| 2008/0155693 A1 | 6/2008 | Mikan et al. |
| 2009/0019547 A1 | 1/2009 | Palliyil et al. |
| 2009/0144827 A1 | 6/2009 | Peinado et al. |
| 2009/0222920 A1 | 9/2009 | Chow et al. |
| 2009/0241191 A1 | 9/2009 | Keromytis et al. |
| 2009/0241196 A1 | 9/2009 | Troyansky et al. |
| 2009/0328216 A1 | 12/2009 | Rafalovich et al. |
| 2010/0058456 A1 | 3/2010 | Jajodia et al. |
| 2010/0071051 A1 | 3/2010 | Choyi et al. |
| 2010/0077483 A1* | 3/2010 | Stolfo ................... G06F 21/554 726/24 |
| 2010/0082513 A1 | 4/2010 | Liu |
| 2010/0251369 A1 | 9/2010 | Grant |
| 2010/0269175 A1 | 10/2010 | Stolfo et al. |
| 2011/0016527 A1 | 1/2011 | Yanovsky et al. |
| 2011/0154494 A1 | 6/2011 | Sundaram et al. |
| 2011/0167494 A1 | 7/2011 | Bowen et al. |
| 2011/0214182 A1 | 9/2011 | Adams et al. |
| 2011/0258705 A1 | 10/2011 | Vestergaard et al. |
| 2011/0307705 A1 | 12/2011 | Fielder |
| 2012/0005756 A1 | 1/2012 | Hoefelmeyer et al. |
| 2012/0084866 A1* | 4/2012 | Stolfo ................... G06F 21/554 726/25 |
| 2012/0167208 A1 | 6/2012 | Buford et al. |
| 2012/0210388 A1 | 8/2012 | Kolishchak |
| 2012/0246724 A1 | 9/2012 | Sheymov et al. |
| 2012/0311703 A1 | 12/2012 | Yanovsky et al. |
| 2013/0061055 A1 | 3/2013 | Schibuk |
| 2013/0086691 A1 | 4/2013 | Fielder |
| 2013/0212644 A1 | 8/2013 | Hughes et al. |
| 2013/0227697 A1 | 8/2013 | Zandani |
| 2013/0263226 A1* | 10/2013 | Sudia ................... H04L 63/1466 726/4 |
| 2014/0101724 A1 | 4/2014 | Wick et al. |
| 2014/0115706 A1 | 4/2014 | Silva et al. |
| 2014/0201836 A1 | 7/2014 | Amsler |
| 2014/0208401 A1 | 7/2014 | Balakrishnan et al. |
| 2014/0259095 A1 | 9/2014 | Bryant |
| 2014/0298469 A1* | 10/2014 | Marion ................... G06F 21/55 726/23 |
| 2014/0310770 A1 | 10/2014 | Mahaffey |
| 2014/0337978 A1 | 11/2014 | Keromytis et al. |
| 2014/0359708 A1 | 12/2014 | Schwartz |
| 2015/0007326 A1 | 1/2015 | Mooring et al. |
| 2015/0013006 A1* | 1/2015 | Shulman ............. H04L 63/1416 726/23 |
| 2015/0047032 A1 | 2/2015 | Hannis et al. |
| 2015/0074750 A1 | 3/2015 | Pearcy et al. |
| 2015/0074811 A1 | 3/2015 | Capalik |
| 2015/0096048 A1 | 4/2015 | Zhang et al. |
| 2015/0128246 A1 | 5/2015 | Feghali et al. |
| 2015/0326587 A1 | 11/2015 | Vissamsetty et al. |
| 2016/0019395 A1 | 1/2016 | Ramalingam et al. |
| 2016/0080414 A1 | 3/2016 | Kolton et al. |
| 2016/0212167 A1 | 7/2016 | Dotan et al. |
| 2016/0261608 A1 | 9/2016 | Hu et al. |
| 2016/0308895 A1 | 10/2016 | Kotler et al. |
| 2016/0323316 A1 | 11/2016 | Kolton et al. |
| 2016/0373447 A1* | 12/2016 | Akiyama ............ H04L 63/1416 |

OTHER PUBLICATIONS

Wikipedia, Active Directory, https://en.wikipedia.org/wiki/Active_Directory, Jun. 24, 2015.

Wikpedia, Apple Filing Protocol, https://en.wikipedia.org/wiki/Apple_Filing_Protocol, Aug. 14, 2015.

(56) References Cited

OTHER PUBLICATIONS

Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
PCT Application No. PCT/IL16/50103, International Search Report and Written Opinion, dated May 26, 2016, 9 pages.
U.S. Appl. No. 15/004,904, Office Action, dated May 27, 2016, 16 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50583, International Search Report and Written Opinion, dated Dec. 8, 2016, 10 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Non-Final Rejection, dated Aug. 19, 2016, 34 pages.
U.S. Appl. No. 15/175,050, Final Rejection, dated Nov. 30, 2016, 31 pages.
U.S. Appl. No. 15/175,050, Notice of Allowance, dated Mar. 21, 2017, 13 pages.
U.S. Appl. No. 15/175,054, Notice of Allowance, dated Feb. 21, 2017, 13 pages.
U.S. Appl. No. 15/403,194, Non-Final Rejection, dated Feb. 28, 2017, 13 pages.
U.S. Appl. No. 15/406,731, Notice of Allowance, dated Apr. 20, 2017, 15 pages.

* cited by examiner

MULTI-FACTOR DECEPTION MANAGEMENT AND DETECTION FOR MALICIOUS ACTIONS IN A COMPUTER NETWORK

CROSS REFERENCES TO RELATED APPLICATIONS

This application is a non-provisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

FIELD OF THE INVENTION

The present invention relates to cyber security, and in particular to computer network surveillance.

BACKGROUND OF THE INVENTION

Reference is made to FIG. 1, which is a simplified diagram of a prior art enterprise network 100 connected to an external internet 10. Network 100 is shown generally with resources including computers 110, servers 120, switches and routers 130, and mobile devices 140 such as smart phones and tablets, for ease of presentation, although it will be appreciated by those skilled in the art that enterprise networks today are generally much more varied and complex and include other devices such as printers, phones and any Internet of Things objects. The various connections shown in FIG. 1 may be direct or indirect, wired or wireless communications, or a combination of wired and wireless connections. Computers 110 and servers 120 may be physical elements or logical elements, or a mix of physical and logical elements. Computers 110 and servers 120 may be physical or virtual machines. Computers 110 and servers 120 may be local, remote or cloud-based elements, or a mix of local, remote and cloud-based elements. Computers 110 may be client workstation computers. Servers 120 may be file transfer protocol (FTP) servers, email servers, structured query language (SQL) servers, secure shell (SSH) servers, and other database and application servers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and servers 120 based on "credentials" and other methods of authentication. Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. For networks that do not include an access governor, authentication may be performed by other servers 120. Alternatively, in lieu of access governor 150, resources of network 100 determine their local access rights.

Credentials for accessing computers 110 and servers 120 include inter alia server account credentials such as <address> <username> <password> for an FTP server, a database server, or an SSH server. Credentials for accessing computers 110 and servers 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another method of authentication. Background information about the Kerberos protocol and LM hashes is available at Wikipedia.

Access governor 150 may maintain a directory of computers 110, servers 120 and their users. Access governor 150 authorizes users and computers, assigns and enforces security policies, and installs and updates software.

Computers 110 may run a local or remote security service, which is an operating system process that verifies users logging in to computers, to other single sign-on systems, and to other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a gateway between enterprise network 100 and external internet 10. Firewall 180 controls incoming and outgoing traffic for network 100. Background information about firewalls is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, network devices and organization structure, learns "where can I go from my current location" and "how can I get there from my current location (privilege required)", learns implemented security solutions, learns applications that he can leverage, and then operates in accordance with that data.

An advanced attacker may use different attack techniques to enter a corporate network and to move laterally within the network in order to obtain his resource goals. The advanced attacker may begin with a workstation, server or any other network entity to start his lateral movement. He uses different methods to enter the network, including inter alia social engineering, existing exploit and/or vulnerability, and a Trojan horse or any other malware allowing him to control a first node or nodes.

Once an attacker has taken control of a first node in a corporate network, he uses different advanced attack techniques for orientation and propagation and discovery of additional ways to reach other network nodes in the corporate network. Attacker movement from node to node is performed via an "attack vector", which is an object discovered by the attacker, including inter alia an object in memory or storage of a first computer that may be used to access or discover a second computer.

Exemplary attack vectors include inter alia credentials of users with escalated privileges, existing share names on different servers and workstations, and details including address and credentials of an FTP server, an email server, a database server or an SSH server. Attack vectors are often available to an attacker because a user did not log off of his workstation, did not log out of an application, or did not clear his cache. E.g., if a user contacted a help desk and gave a help desk administrator remote access to his workstation, and if the help desk administrator did not properly log off from the remote access session to the users workstation, then the help desk access credentials may still be stored in the user's local cache and available to the attacker. Similarly, if the user accessed a server, e.g., an FTP server, then the FTP account login parameters may be stored in the user's local cache or profile and available to the attacker.

Attack vectors enable inter alia a move from workstation A→server B based on a shared server host name and its credentials, connection to a different workstation using local admin credentials that reside on a current workstation, and connection to an FTP server using specific access credentials.

Whereas IT "sees" the logical and physical network topology, an attacker that lands on a first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "complete attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network nodes that are of value to the attacker and are his "attack goal nodes".

When the attacker lands on the first node, but does not know how to reach the attack goal node, he generates a current attack map that leads to the attack goal node.

One method to defend against such attacks, termed "honeypots", is to plant and monitor bait resources, with the objective that the attacker learn of their existence and then consume those bait resources, and to notify an administrator of the malicious activity. Background information about honeypots is available at Wikipedia.

Conventional honeypot systems operate by monitoring access to a supervised element in a computer network, the supervised element being a fake server or a fake service. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

SUMMARY

Embodiments of the present invention enhance confidence levels in identifying an attacker, by luring him into multiple access attempts to different resources monitored by the system, or into a single access attempt that requires multiple actions.

There is thus provided in accordance with an embodiment of the present invention a system for two-factor network surveillance to detect attackers, including a management server within a network of resources in which users access the resources in the network based on credentials, including a deployment module planting one or more honeytokens in one or more of the resources in the network, wherein a honeytoken is an object in memory or storage of a first resource that may be used by an attacker to access a second resource using decoy credentials, and wherein the deployment module plants a first honeytoken in a first resource, $R_1$, used to access a second resource, $R_2$, using first decoy credentials, and plants a second honeytoken in $R_2$, used to access a third resource, $R_3$, using second decoy credentials, and an alert module alerting that an attacker is intruding the network only in response to both (1) an attempt to access $R_2$ using the first decoy credentials, and (2) a subsequent attempt to access $R_3$ using the second decoy credentials.

There is additionally provided in accordance with an embodiment of the present invention a network surveillance method to detect attackers, including planting one or more honeytokens in one or more resources in a network of computers in which users access the resources in the network based on credentials, wherein a honeytoken is an object in memory or storage of a first resource that may be used by an attacker to access a second resource using decoy credentials, including planting a first honeytoken in a first resource, $R_1$, used to access a second resource, $R_2$, using first decoy credentials, and planting a second honeytoken in $R_2$, used to access a third resource, $R_3$, using second decoy credentials, and alerting that an attacker is intruding the network only in response to both (i) an attempt to access $R_2$ using the first decoy credentials, and (ii) a subsequent attempt to access $R_3$ using the second decoy credentials.

There is further provided in accordance with an embodiment of the present invention a system for two-factor network surveillance to detect attackers, including a management server within a network of resources in which users access the resources in the network based on credentials, including a deployment module planting one or more honeytokens in one or more of the resources in the network, wherein a honeytoken is an object in memory or storage of a first resource that may be used by an attacker to access a second resource using decoy credentials, and wherein the deployment module plants a first honeytoken in a first resource, $R_1$, used to access a second resource, $R_2$, using first decoy credentials, and plants a second honeytoken in $R_1$, used to access a third resource, $R_3$, using second decoy credentials, and an alert module alerting that an attacker is intruding the network only in response to both (1) an attempt to access $R_2$ using the first decoy credentials, and (2) a subsequent attempt to access $R_3$ using the second decoy credentials.

There is yet further provided in accordance with an embodiment of the present invention a network surveillance method to detect attackers, including planting one or more honeytokens in one or more resources in a network of computers in which users access the resources in the network based on credentials, wherein a honeytoken is an object in memory or storage of a first resource that may be used by an attacker to access a second resource using decoy credentials, including planting a first honeytoken in a first resource, $R_1$, used to access a second resource, $R_2$, using first decoy credentials and planting a second honeytoken in $R_1$, used to access a third resource, $R_3$, using second decoy credentials, and alerting that an attacker is intruding the network only in response to both (i) an attempt to access $R_2$ using the first decoy credentials, and (ii) a subsequent attempt to access $R_3$ using the second decoy credentials.

There is moreover provided in accordance with an embodiment of the present invention a system for two-factor network surveillance to detect attackers, including a management server within a network of resources, some of the resources being legitimate enterprise resources and others of the resources being decoy resources for the purpose of intrusion detection, the management server including a deployment module planting one or more honeytokens in one or more of the resources in the network, wherein a honeytoken is an object in memory or storage of a first resource that may be used by an attacker to discover existence of a second resource, and wherein said deployment module plants a first honeytoken in a resource, R, used to discover a first decoy resource, $R_1$, and plants a second honeytoken in $R_1$, used to discover a second decoy resource, $R_2$, and an alert module alerting that an attacker is intruding the network only in response to both (1) an attempt to access $R_1$, and (2) an attempt to access $R_2$.

There is additionally provided in accordance with an embodiment of the present invention a network surveillance method to detect attackers, including planting one or more honeytokens in one or more resources of a network of resources, some of the resources being legitimate enterprise resources and others of the resources being decoy resources for the purpose of intrusion detection, wherein a honeytoken is an object in memory or storage of a first resource that may be used by an attacker to discover existence of a second resource, including planting a first honeytoken in a resource, R, used to discover a first decoy resource, $R_1$, and planting a second honeytoken in $R_1$, used to discover a second decoy resource, $R_2$, and alerting that an attacker is intruding the network only in response to both (i) an attempt to access $R_1$, and (ii) an attempt to access $R_2$.

There is further provided in accordance with an embodiment of the present invention a system for two-factor network surveillance to detect attackers, including a management server within a network of resources, some of the resources being legitimate enterprise resources and others of the resources being decoy resources for the purpose of intrusion detection, the management server including a deployment module planting one or more honeytokens in one or more of the resources in the network, wherein a honeytoken is an object in memory or storage of a first resource that may be used by an attacker to discover existence of a second resource, and wherein the deployment module plants a first honeytoken in a resource, R, used to discover a first decoy resource, $R_1$, and plants a second honeytoken in R, used to discover a second decoy resource, $R_2$, and an alert module alerting that an attacker is intruding the network only in response to both (1) an attempt to access $R_1$, and (2) an attempt to access $R_2$.

There is yet further provided in accordance with an embodiment of the present invention a network surveillance method to detect attackers, including planting one or more honeytokens in one or more resources of a network of resources, some of the resources being legitimate enterprise resources and others of the resources being decoy resources for the purpose of intrusion detection, wherein a honeytoken is an object in memory or storage of a first resource that may be used by an attacker to discover existence of a second resource, including planting a first honeytoken in a resource, R, used to discover a first decoy resource, $R_1$, and planting a second honeytoken in R, used to discover a second decoy resource, $R_2$, and alerting that an attacker is intruding the network only in response to both (i) an attempt to access $R_1$, and (ii) an attempt to access $R_2$.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

| Element | Description |
| --- | --- |
| 10 | Internet |
| 100 | enterprise network |
| 110 | network computers |
| 120 | network servers |
| 130 | network switches and routers |
| 140 | mobile devices |
| 150 | access governor (optional) |
| 252 | forensic alert module |
| 160 | SIEM server |
| 170 | DNS server |
| 180 | firewall |
| 200 | enterprise network with network surveillance |
| 210 | deception management server |
| 211 | policy manager |
| 212 | deployment module |
| 213 | forensic application |
| 220 | database of credential types |
| 230 | policy database |
| 240 | decoy servers |
| 242 | forensic alert module |
| 260 | update server |

Elements numbered in the 1000's are operations of flow charts.

DETAILED DESCRIPTION

In accordance with embodiments of the present invention, systems and methods are provided for dynamically managing decoy policies for an enterprise network, which are planted in such a way as to increase confidence of detecting an attacker of the network, and to reduce false alerts.

Figure 1:
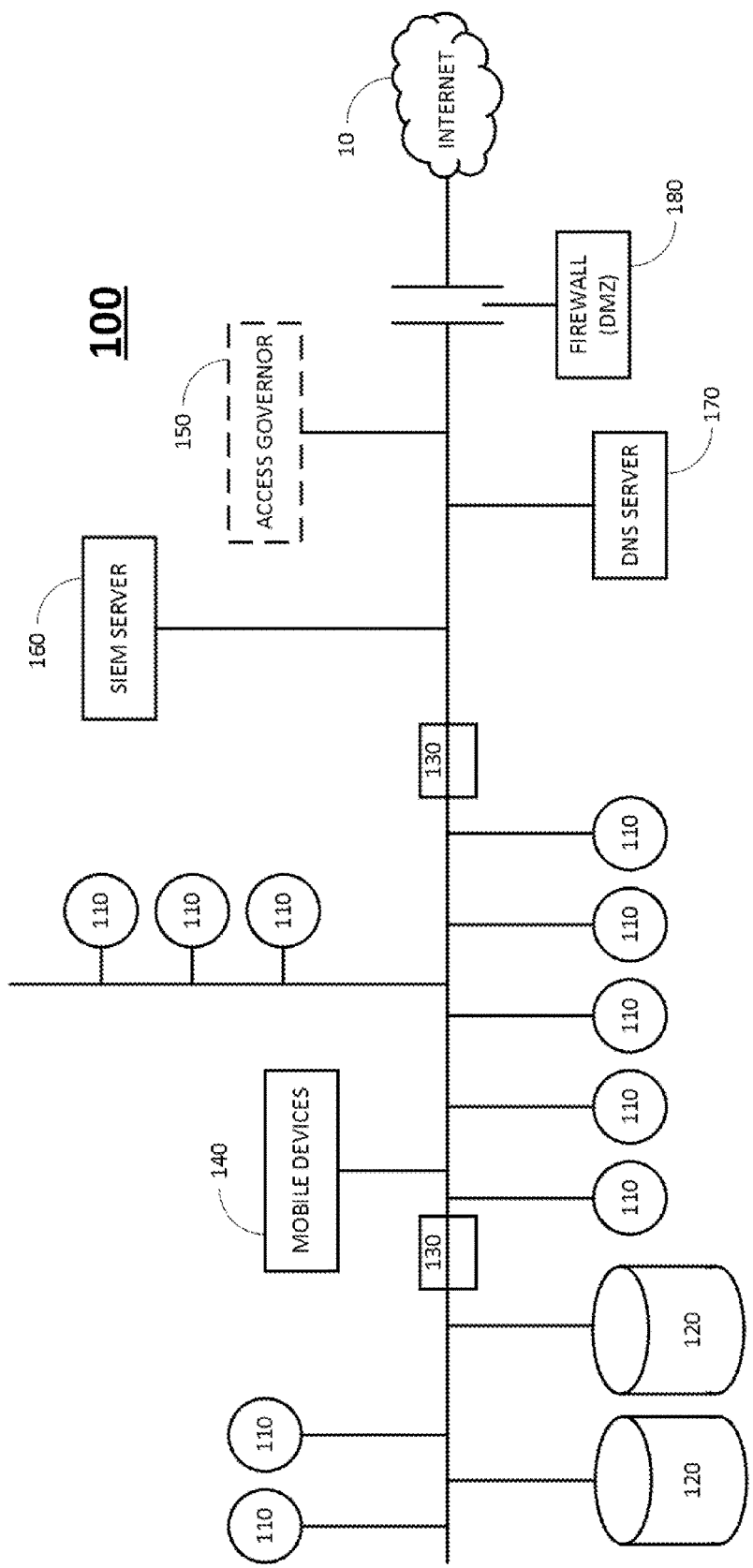
FIG. 1 is a simplified diagram of a prior art enterprise network connected to an external internet.
Figure 2:
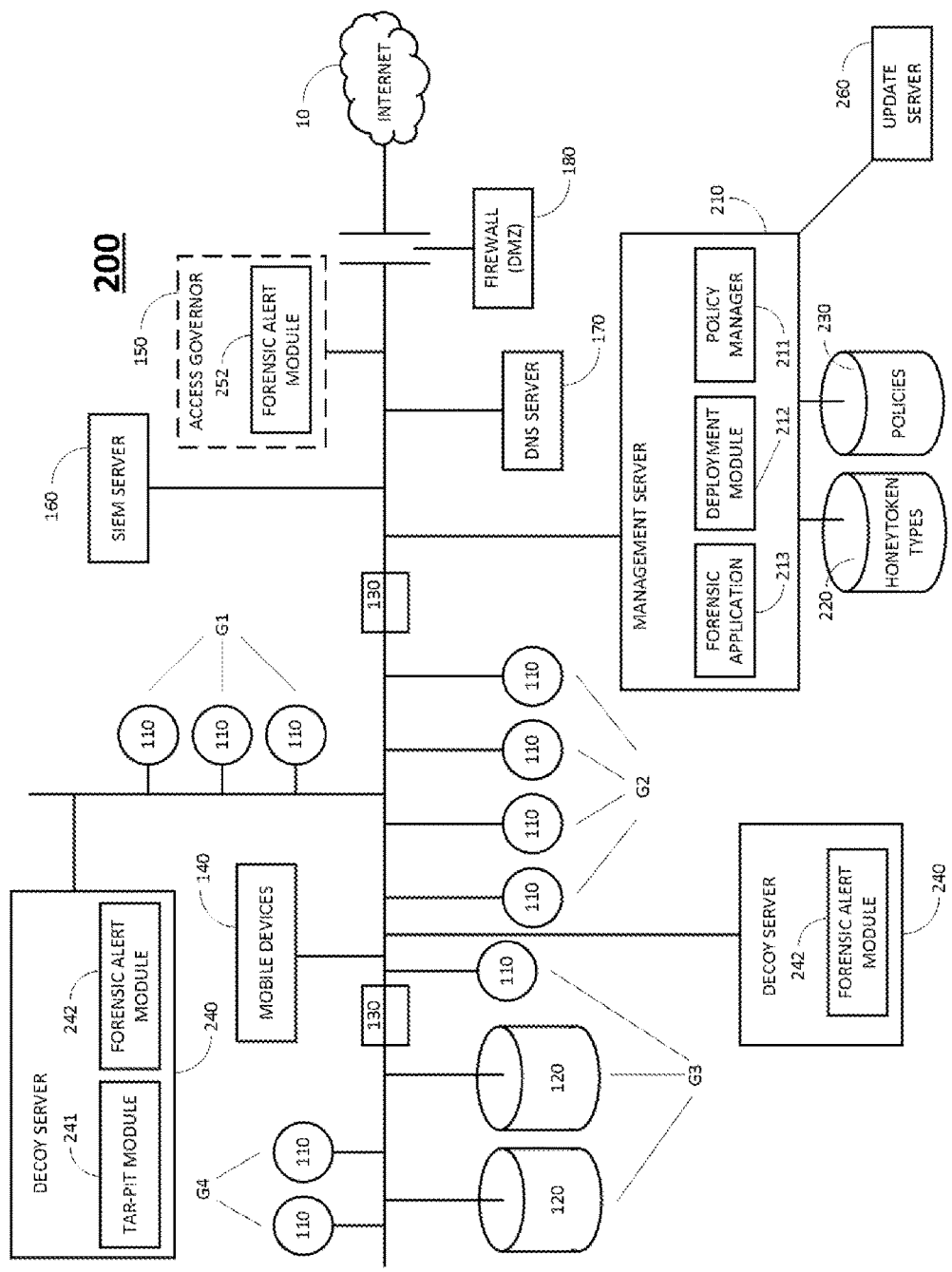
FIG. 2 is a simplified diagram of an enterprise network with network surveillance, in accordance with an embodiment of the present invention.

Reference is made to FIG. 2, which is a simplified diagram of an enterprise network 200 with network surveillance, in accordance with an embodiment of the present invention. Network 200 includes a management server 210, a database 220 of "honeytokens", a policy database 230 and decoy servers 240. In addition, network computers 110 and servers 120 are grouped into groups G1, G2, G3 and G4. A "honeytoken" is data that may be used by an attacker to access a resource within network 200, or merely to discover the existence of the resource without being able to access it. Symbolically HT→R, i.e., honeytoken HT provides a pointer to resource R within network 200. Resource R may be inter alia (i) a computing device, such as a server computer or a router, or (ii) a service or application running on a computing device, such as an active directory service, a database application that accesses secure data, a financial application with transaction capability, a data transmission application, or a command and control application.

A honeytoken may be embodied as an object in memory or storage of a first resource within network 200 that may be used by an attacker to access a second resource within network 200, or merely to discover the existence of a second resource without being able to access it. In some cases, the first and second resources reside on the same computer, e.g., the second resource may be a service or application that requires a higher level of authentication than the first resource. A honeytoken may also be embodied as data, such as packet data, transmitted to or from a resource within network 200 or between resources within network 200. An attacker generally uses honeytokens as clues within a treasure hunt.

The resource that a honeytoken points to may be (i) a real resource that exists within network 200, e.g., an FTP server, (ii) a decoy resource that exists within network 200, e.g., a decoy server 240, or (iii) a resource that does not exist. In the latter case, when an attacker attempts to access a resource that does not exist, access governor 150 recognizes a pointer to a resource that is non-existent. Access governor 150 responds by notifying management server 210, or by re-directing the pointer to a resource that does exist in order to survey the attacker's moves, or both.

Database 220 stores honeytokens that fake detection of and access to computers 110, servers 120 and other resources in network 200. Honeytokens include inter alia:

user names of the form <username>
user credentials of the form <username> <password>
user credentials of the form <username> <hash of password>
user credentials of the form <username> <ticket>
FTP server addresses of the form <FTP address>
FTP server credentials of the form <FTP address> <username> <password>
SSH server addresses of the form <SSH address>
SSH server credentials of the form <SSH address> <username> <password>
share addresses of the form <SMB address>

The honeytokens stored in database 220 are categorized by families, such as inter alia F1—user credentials
F2—files
F3—connections
F4—FTP logins
F5—SSH logins
F6—share names
F7—databases
F8—network devices
F9—URLs
F10—Remote Desktop Protocol (RDP)
F11—recent commands
F12—scanners
F13—cookies
F14—cache
F15—Virtual Private Network (VPN)
F16—key logger Database 220 communicates with an update server 260, which updates database 220 as new types of honeytokens for detecting and accessing computers evolve over time, and as new algorithms for generating honeytokens arise. In addition to the honeytokens residing within database 220, new honeytokens are also created dynamically.

Policy database 230 stores policies for planting honeytokens in computers of network 200. Each policy specifies honeytokens that are planted in the computers, in accordance with honeytokens stored in database 220 and in accordance with new honeytokens that are dynamically generated. Honeytoken user credentials planted on a computer may lead to another resource in the network. Honeytokens to access an FTP, or other server, planted on a computer may lead to a decoy server 240.

It will be appreciated by those skilled in the art the databases 220 and 230 may be combined into a single database, or distributed over multiple databases.

Management server 210 includes a policy manager 211, a deployment module 212, and a forensic application 213. Policy manager 211 defines a decoy and response policy. The decoy and response policy defines different honeytoken types, different honeytoken combinations, response procedures, notification services, and assignments of policies to specific network nodes, network users, groups of nodes or users or both. Once policies are defined, they are stored in policy database 230 with the defined assignments.

In some embodiments of the present invention, some or all components of management server 210 may be integrated within an already existing enterprise deployment agent.

Deception management server 210 obtains the policies and their assignments from policy database 230, and delivers them to appropriate nodes and groups. It then launches deployment module 212 to plant honeytoken on end points, servers, applications, routers, switches, relays and other entities in the network. Deployment module 212 plants each honeytoken, based on its type, in memory (RAM), disk, or in any other data or information storage area, as appropriate, or as data, such as packet data, that is transmitted to or from a resource within network 200 or between resources of network 200. Deployment module 212 plants the honeytokens in such a way that the chances of a valid user accessing the honeytokens are low. Deployment module 212 may or may not stay resident.

Forensic application 213 is a real-time application that is transmitted to a destination computer in the network, when a honeytoken is accessed by a computer 110. When forensic application 213 is launched on the destination computer, it identifies a process running within that computer 110 that accessed that honeytoken, logs the activities performed by the thus-identified process in a forensic report, and transmits the forensic report to decoy management server 210. Forensic application 213 also identifies and logs recent file activity, connection activity, background activity, and other time-based information that may be used to track an attacker's activity.

Once an attacker is detected, a "response procedure" is launched. The response procedure includes inter alia various notifications to various addresses, and actions on a decoy server such as launching an investigation process, and isolating, shutting down and re-imaging one or more network nodes. The response procedure collects information available on one or more nodes that may help in identifying the attacker's attack acts, intention and progress.

Each decoy server 240 includes a forensic alert module 242, which creates a log and/or alerts management system 210 that an attacker is accessing the decoy server via a computer 110 of the network, and causes management server 210 to send forensic application 213 to the computer that is accessing the decoy server. In an alternative embodiment of the present invention, decoy server 240 may store forensic application 213, in which case decoy server 240 may transmit forensic application 213 directly to the computer that is accessing the decoy server. In another alternative embodiment of the present invention, management server 210 or decoy server 240 may transmit forensic application 213 to a destination computer other than the computer that is accessing the decoy server. Access governor 150 also activates a forensic alert module 252, which creates a log and/or alerts management server 210 that an attacker is attempting to use a decoy credential.

Notification servers (not shown) are notified when an attacker uses a honeytoken. The notification servers may discover this by themselves, or by using information stored on access governor 150 and SIEM 160. The notification servers forward notifications, or results of processing multiple notifications, to create notification time lines or such other analytics.

As mentioned above, conventional honeypot systems generate many fake alerts. Embodiments of the present invention enhance confidence levels in identifying an attacker, by luring him into multiple access attempts to different resources monitored by the system, or into a single access attempt that requires multiple actions. The access attempts are comprised of multiple factors, each factor having a likelihood of being the intentional action of an attacker. FIGS. 3-6 provide several embodiments of multi-factor deployment of honeytokens, as described below Each factor may be inter alia an access attempt to a specific resource, or an action performed hi order to attempt access to a specific resource. Management server 210 issues an alert an alert only when two or more suspicious factors indicate an attack.

Figure 3:
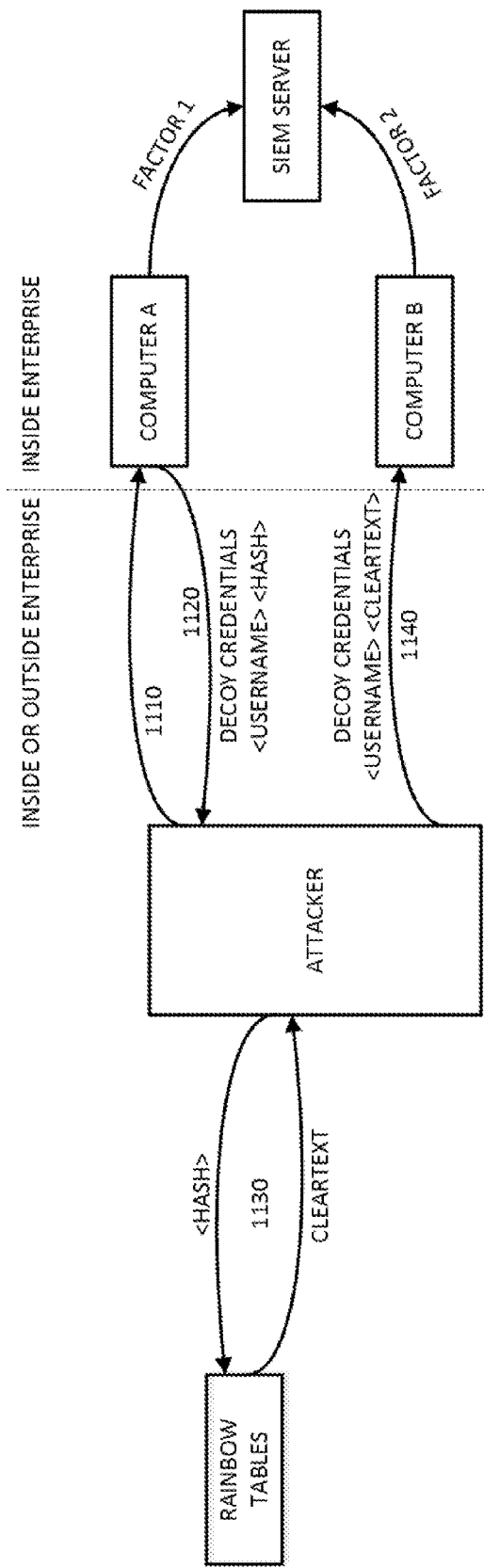
FIG. 3 is a simplified diagram of a method for network surveillance using two-factor deception, in accordance with an embodiment of the present invention.

Reference is made to FIG. 3, which is a simplified diagram of a method for network surveillance using two-factor deception, in accordance with an embodiment of the present invention. At operation 1110 an attacker accesses a computer A of network 200. At operation 1120 the attacker obtains a honeytoken with decoy credentials for accessing a computer B of network 200, the decoy credentials being of the form <username> <hash>, where <hash> is a hash value of a cleartext password. The decoy credentials are preferably planted in computer A such that the chances of a valid user or automated monitor accessing the credentials are low, At operation 1130 the attacker derives the cleartext password from <hash>. Operation 1130 may be performed by rainbow tables, which are pre-computed tables used by attackers for reversing cryptographic hash functions, At operation 1140 the attacker attempts a login to computer B using the cleartext version of the decoy credentials <username> <cleartext password>. At this stage, the chances of such login being performed by a valid user or automated monitor are extremely low, since this login requires two suspicious factors; namely; (i) extracting the decoy credentials with the hash value of the cleartext password from computer A, and (ii) reversing the extracted hash value to obtain the cleartext password. FIG. 3 is an example of a single access that requires two actions.

It is noted in FIG. 3 that an attacker may be located inside or outside the enterprise network. Embodiments of the present invention monitor for malicious action regardless of whether the perpetrator is someone from inside or someone from outside of the enterprise.

Figure 4:
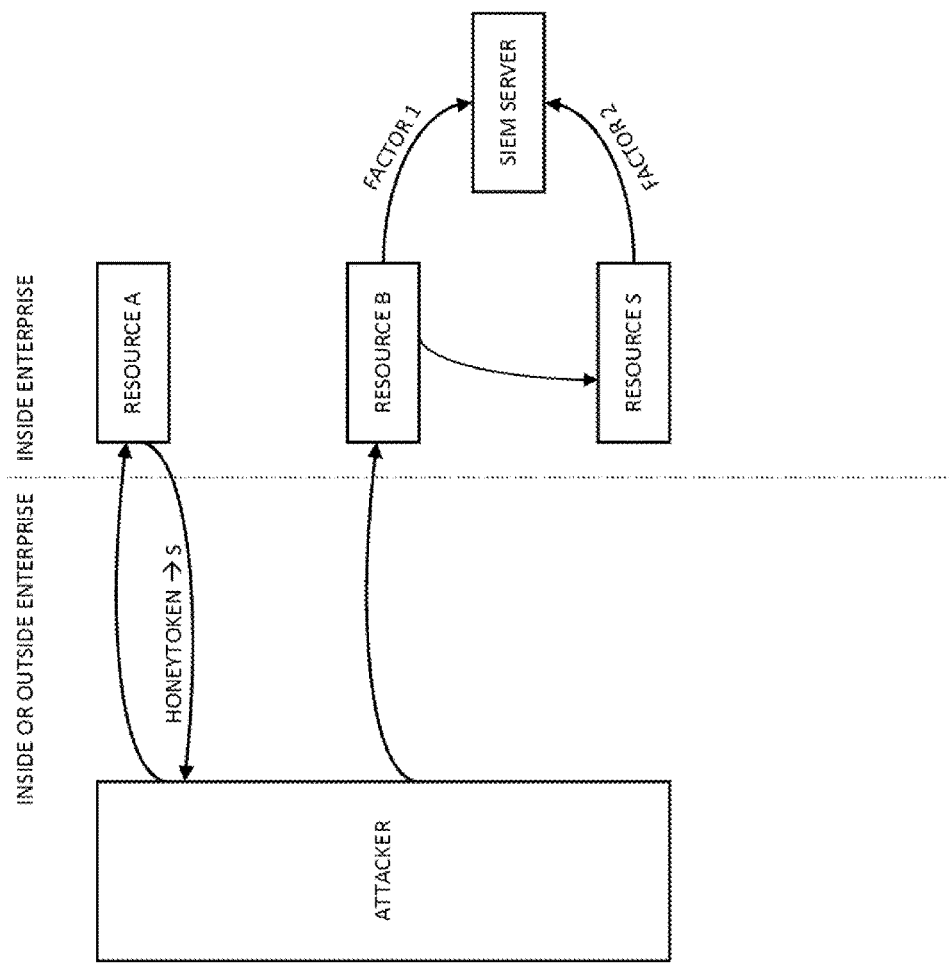
FIG. 4 is a simplified diagram of a method for network surveillance using two-factor deception, in accordance with an embodiment of the present invention.

Reference is made to FIG. 4, which is a simplified diagram of a method for network surveillance using two-factor deception, in accordance with an embodiment of the present invention. When an attacker discovers a honeytoken planted on a resource A with, say, a name of a server S, the attacker may retrieve the honeytoken data without attempting to access server S from resource A. The attacker may subsequently return to a different resource B, from which he tries to use the honeytoken data to access server S. As long as the honeytoken planted on resource A is unique to resource A, then the attack coming from resource B may be reliably identified, and diagnosed to conclude that the attacker's data was retrieved from resource A. As such, there are two incriminating factors; namely, (1) retrieval of the honeytoken from resource A, and (2) intrusion into resource S, and management server 210 issues an alert only when both factors have occurred.

Figure 5:
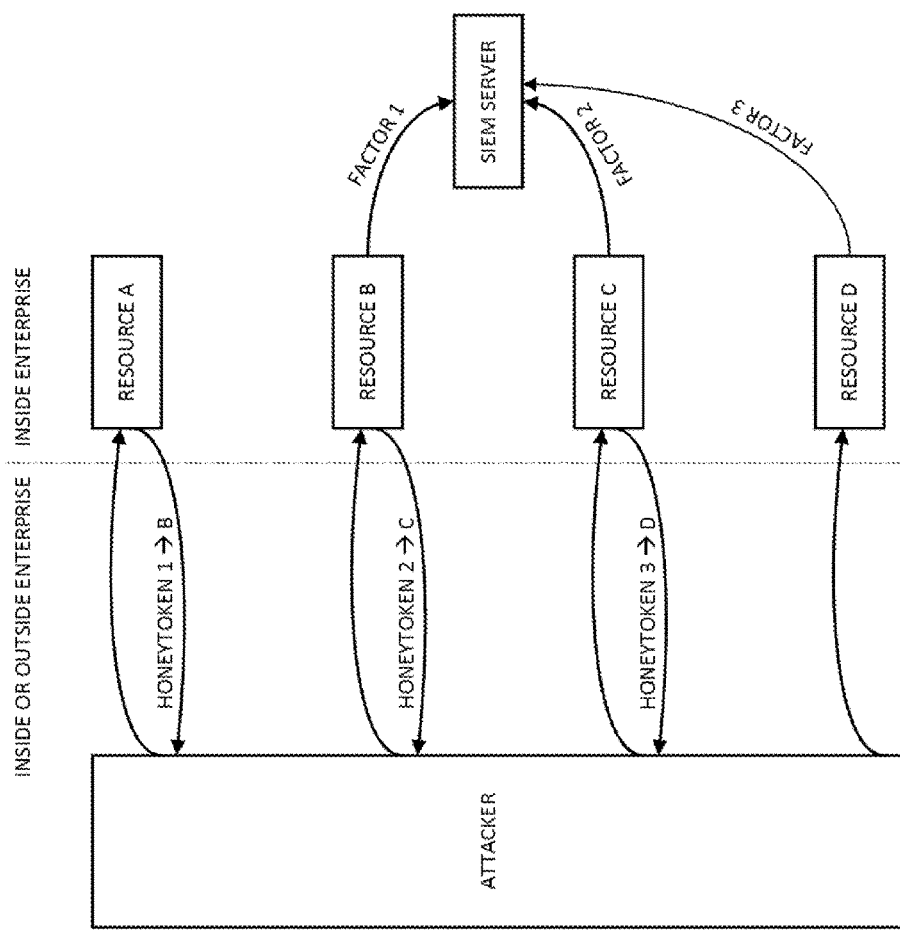
FIG. 5 is a simplified diagram of a method for network surveillance using multi-factor deception, in accordance with an embodiment of the present invention.

Reference is made to FIG. 5, which is a simplified diagram of a method for network surveillance using multi-factor deception, in accordance with an embodiment of the present invention. With each successive intrusion of a resource, management server 210 provides a successive honeytoken from that resource to a next resource. The successive resources are structured so that the chances of a legitimate user accessing those resources are low.

The successive honeytokens are arranged such that each honeytoken may only be obtained after obtaining the previous ones, similar to successive clues in a treasure hunt, where one clue leads to the next. In the subject environment of intrusion detection, the clues are decoys. Thus, referring to FIG. 5, honeytoken 2→C can only be obtained when resource B is accessed via honeytoken 1→B, and honeytoken 3→D can only be obtained when resource C is accessed via honeytoken 2→C. Each access to a resource is reported to SIEM server 160, allowing for evaluation of a confidence level that a suspected attacker is indeed a malicious attacker. The successive access attempts continue by providing the suspected attacker with successive honeytokens pointing at previously used or new resources, until a threshold confidence level is reached. Management server 210 issues an alert only when three access attempts have occurred.

Resources A, B, C and D in FIG. 5 may reside on different computers, or on the same computer. E.g., resources A, B, C, D may be services or applications running on the same computer that require different levels of authentication, As explained with reference to FIG. 4 above, the attack on resource B shown in FIG. 5 may be via resource A, or via a different resource using honeytoken 1→B. Similarly for the attacks on resources C and D.

Figure 6:
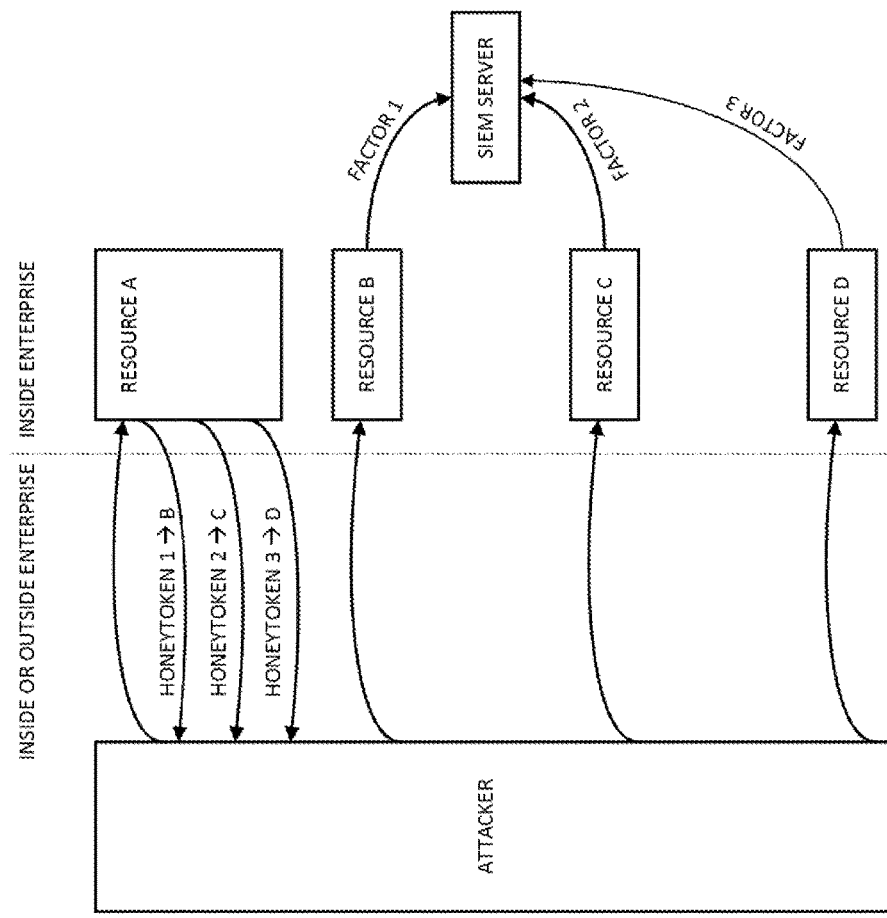
FIG. 6 is a simplified diagram of a method for network surveillance using multi-factor deception, in accordance with an embodiment of the present invention.

Reference is made to FIG. 6, which is a simplified diagram of a method for network surveillance using multi-factor deception, in accordance with an embodiment of the present invention. Three honeytoken attack vectors are planted on resource A; namely, honeytoken 1→B, honeytoken 2→C, honeytoken 3→D. Each use of a honeytoken is reported to SIEM server 160, allowing for evaluation of a confidence level that the resources are being accessed by a malicious attacker. Management server 210 issues an alert only when three access attempts have occurred.

As explained with reference to FIG. 4 above, the attack on resource B shown in FIG. 5 may be via resource A, or via a different resource using honeytoken 1→B. Similarly for the attacks on resources C and D.

When an attacker discovers a honeytoken with a name and credentials of a resource, the attacker may nevertheless attempt accessing the resource with different credentials or via an exploit.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for multi-factor network surveillance to detect attackers, comprising:
   a management server within a network of resources in which users access the resources based on credentials, comprising a memory containing instructions and a processor that executes the instructions to plant decoy credentials $DC_1$, $DC_2$, and $DC_3$, in memory or storage of respective resources $R_1$, $R_2$ and $R_3$, wherein the decoy credentials $DC_1$ $DC_2$ and $DC_3$ may be used by an attacker to access respective resources $R_2$, $R_3$ and $R_4$, and wherein $R_1$ is a bona fide enterprise resource, and $R_2$, $R_3$ and $R_4$ are decoy resources for the purpose of intrusion detection; and
   a security manager comprising a memory containing instructions and a processor that executes the instructions to receive reports of attempts to use decoy credentials and to generate an alert that an attacker is intruding the network only when attempts to use the three decoy credentials $DC_1$ $DC_2$ and $DC_3$ are reported.

2. The system of claim 1 wherein credentials include passwords for accessing resources in the network, and wherein the decoy credentials include respective hash versions of corresponding passwords.

3. The system of claim 1 wherein credentials include members of the group consisting of user credentials, FTP server credentials and SSH server credentials.

4. A system for multi-factor network surveillance to detect attackers, comprising:
   a management server within a network of resources, comprising a memory containing instructions and a processor that executes the instructions to plant honeytokens $HT_1$ $HT_2$ and $HT_3$ in respective resources $R_1$, $R_2$ and $R_3$, wherein honeytokens $HT_1$ $HT_2$ and $HT_3$ are objects in memory or storage of $R_1$, $R_2$ and $R_3$, respectively, that may be used by an attacker to discover existence of $R_2$, $R_3$ and $R_4$, respectively, and wherein $R_1$ is a bona fide enterprise resource and $R_2$, $R_3$ and $R_4$ are decoy resources for the purpose of intrusion detection; and
   a security manager comprising a memory containing instructions and a processor that executes the instructions to receive reports of attempts to access resources, and to generate an alert that an attacker is intruding the network only when attempts to access the three resources $R_2$, $R_3$ and $R_4$ are reported.

* * * * *